US009513611B2

(12) United States Patent
Archer et al.

(10) Patent No.: US 9,513,611 B2
(45) Date of Patent: *Dec. 6, 2016

(54) ADJUSTING ENVIRONMENTAL VARIABLES IN AN ADAPTIVE PARAMETER ADJUSTMENT RUNTIME ENVIRONMENT

(71) Applicant: International Business Machines Corporation, Armonk, NY (US)

(72) Inventors: Charles J. Archer, Hillsboro, OR (US); Nysal Jan K.A., Bangalore (IN); Sameh S. Sharkawi, Cypress, TX (US)

(73) Assignee: International Business Machines Corporation, Armonk, NY (US)

(*) Notice: Subject to any disclaimer, the term of this patent is extended or adjusted under 35 U.S.C. 154(b) by 394 days.

This patent is subject to a terminal disclaimer.

(21) Appl. No.: 14/278,595

(22) Filed: May 15, 2014

(65) Prior Publication Data

US 2015/0192910 A1   Jul. 9, 2015

Related U.S. Application Data

(63) Continuation of application No. 14/148,950, filed on Jan. 7, 2014.

(51) Int. Cl.
G05B 13/02 (2006.01)
(52) U.S. Cl.
CPC .................... *G05B 13/024* (2013.01)
(58) Field of Classification Search
CPC ...................................... G05B 13/024
(Continued)

(56) References Cited

U.S. PATENT DOCUMENTS 8,081,565 B2* 12/2011 Moore ................ H04L 12/5695
370/229
8,145,799 B2* 3/2012 Lawson .............. B61L 27/0088
710/8
(Continued)

OTHER PUBLICATIONS

Kwong, Raymond H., and Edward W. Johnston. "A variable step size LMS algorithm." IEEE Transactions on signal processing 40.7 (1992): pp. 1633-1642.*

(Continued)

*Primary Examiner* — Satish Rampuria
(74) *Attorney, Agent, or Firm* — Brandon C. Kennedy; Feb Cabrasawan; Kennedy Lenart Spraggins LLP

(57) ABSTRACT

Adjusting environmental variables in an adaptive parameter adjustment runtime environment, including: executing a parallel program by the adaptive parameter adjustment runtime environment, including beginning operations with a set of default global parameter values; maintaining a list of configurable parameters; changing a parameter value for a parameter in the list of configurable parameters; determining whether an effect of changing the parameter value is positive, negative, or neutral; responsive to determining that the effect of changing the parameter value is positive, changing the parameter value for the parameter; responsive to determining that the effect of changing the parameter value is negative, changing the parameter value for the parameter to a previous value; and responsive to determining that the effect of changing the parameter value is neutral, performing a list management operation on the list of configurable parameters.

6 Claims, 8 Drawing Sheets

(58) Field of Classification Search
USPC .......................................... 700/28–39, 67–74
See application file for complete search history.

(56) References Cited

U.S. PATENT DOCUMENTS

| | | | | |
|---|---|---|---|---|
| 8,248,428 | B2* | 8/2012 | Kowalski | G06T 11/60 345/581 |
| 8,819,652 | B2* | 8/2014 | Zingelewicz | G06F 8/77 717/135 |
| 2007/0078540 | A1* | 4/2007 | Bump | G05B 19/41845 700/90 |

OTHER PUBLICATIONS

Tichy, Matthias, and Holger Giese. "A self-optimizing run-time architecture for configurable dependability of services." Architecting Dependable Systems II. Springer Berlin Heidelberg, 2004. pp. 25-50.*

Tkachuk, Oksana, Matthew B. Dwyer, and Corina S. Pasareanu. "Automated environment generation for software model checking." Automated Software Engineering, 2003. Proceedings. 18th IEEE International Conference on. IEEE, 2003. pp. 1-11.*

Guo et al., "Automated and Agile Server Parameter Tuning with Learning Control," IEEE 26th International Parallel and Distributed Processing Symposium (IPDPS), dated 2012, 12 pages, vol. 25, Issue 4, IEEE Computer Society (online), DOI: 10.1109/IPDPS. 2012.66, Print ISBN: 978-1-4673-0975-2.

Sun et al., "A Distributed Trust Management Scheme in the Pervasive Computing Environment," Canadian Conference on Electrical and Computer Engineering (CCECE), dated 2007, 4 pages, IEEE (online), DOI: 10.1109/CCECE.2007.311, Print ISBN: 1-244-1020-7, Vancouver, BC.

Kundu et al., "Application Performance Modeling in a Virtualized Environment," IEEE 16th International Symposium on High Performance Computer Architecture (HPCA), dated 2010, 10 pages, IEEE (online), DOI: 10.1109/HPCA.2010.5463058, Print ISBN: 978-1-4244-5658-1.

Mishra, BP., et al., "Parallel Computing Environments: A Review," IETE Tech Rev [serial online] 2011 [cited May 7, 2013] pp. 240-247, vol. 28, Issue 3, Available from: http://tr.ietejournals.org/text.asp?2011/28/3/240/81245, DOI: 10.4103/0256-4602.81245, Last Accessed: May 7, 2013.

Knudson, B., et al., "IBM System Blue Gene Solution: Blue Gene/P Application Development," IBM Redbooks, Aug. 2009, pp. 1-406, Fourth Edition, International Technical Support Organization, Rochester, Minnesota.

* cited by examiner

ADJUSTING ENVIRONMENTAL VARIABLES IN AN ADAPTIVE PARAMETER ADJUSTMENT RUNTIME ENVIRONMENT

CROSS-REFERENCE TO RELATED APPLICATION

This application is a continuation application of and claims priority from U.S. patent application Ser. No. 14/148,950, filed on Jan. 7, 2014.

BACKGROUND OF THE INVENTION

Field of the Invention

The field of the invention is data processing, or, more specifically, methods, apparatus, and products for adjusting environmental variables in an adaptive parameter adjustment runtime environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include high-performance computing (HPC) systems that utilize parallel processing for running advanced application programs efficiently, reliably, and quickly. To meet the needs of scientific research and engineering simulations, supercomputers are growing at an unrelenting rate. As supercomputers increase in size from mere thousands to hundreds-of-thousands of processor cores, new performance and scalability challenges have emerged. One of these hardest performance challenges is tuning collective communication performance, which are functions involving all the processors within a defined communicator group (defined set of tasks/processors).

SUMMARY OF THE INVENTION

Methods, apparatuses, and products for adjusting environmental variables in an adaptive parameter adjustment runtime environment, including: executing a parallel program by the adaptive parameter adjustment runtime environment, including beginning operations with a set of default global parameter values; maintaining, by a parameter control engine, a list of configurable parameters; changing, by the parameter control engine, a parameter value for a parameter in the list of configurable parameters; determining, by the parameter control engine, whether an effect of changing the parameter value is positive, negative, or neutral; responsive to determining that the effect of changing the parameter value is positive, changing, by the parameter control engine, the parameter value for the parameter; responsive to determining that the effect of changing the parameter value is negative, changing, by the parameter control engine, the parameter value for the parameter to a previous value; and responsive to determining that the effect of changing the parameter value is neutral, performing, by the parameter control engine, a list management operation on the list of configurable parameters.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
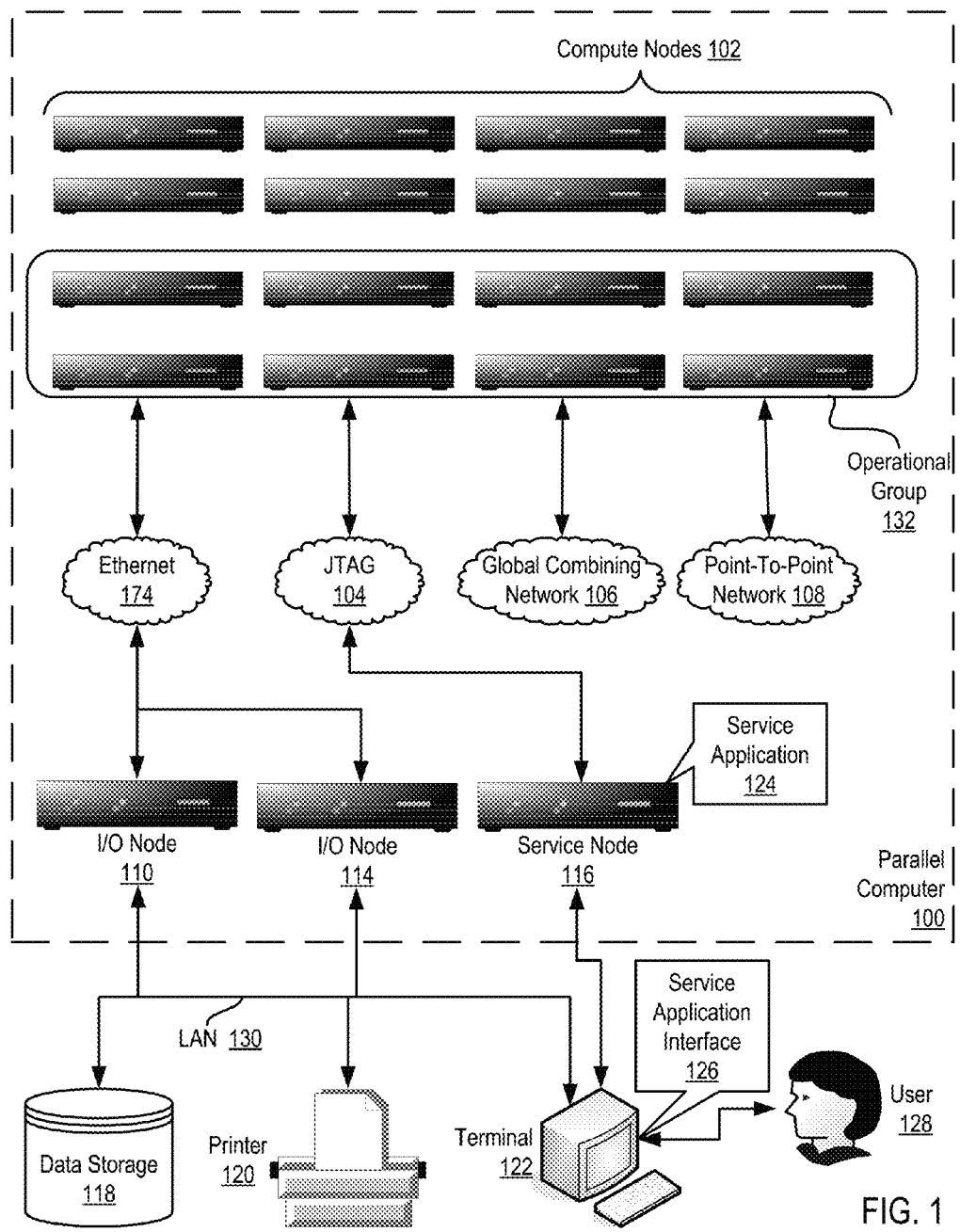
FIG. 1 illustrates an example system for adjusting environmental variables in an adaptive parameter adjustment runtime environment according to embodiments of the present invention.

Example methods, apparatuses, and products for adjusting environmental variables in an adaptive parameter adjustment runtime environment according to embodiments of the present invention in accordance with the present invention are described with reference to the accompanying drawings, beginning with FIG. 1. FIG. 1 illustrates an example system for adjusting environmental variables in an adaptive parameter adjustment runtime environment according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for adjusting environmental variables in an adaptive parameter adjustment runtime environment in accordance with embodiments of the present invention. As mentioned above, some parallel application may be split into parallel processes or parallel tasks. For simplicity in this specification a single compute node is often described as executing a single task. Readers will understand however that a compute node may execute in any number of tasks. In the example of FIG. 1, each compute node (102) may execute a number of tasks where at least one of the compute nodes executes a number of tasks that is different than the number of tasks executed by another one of the compute nodes.

Adjusting environmental variables in an adaptive parameter adjustment runtime environment according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in adjusting environmental variables in an adaptive parameter adjustment runtime environment according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
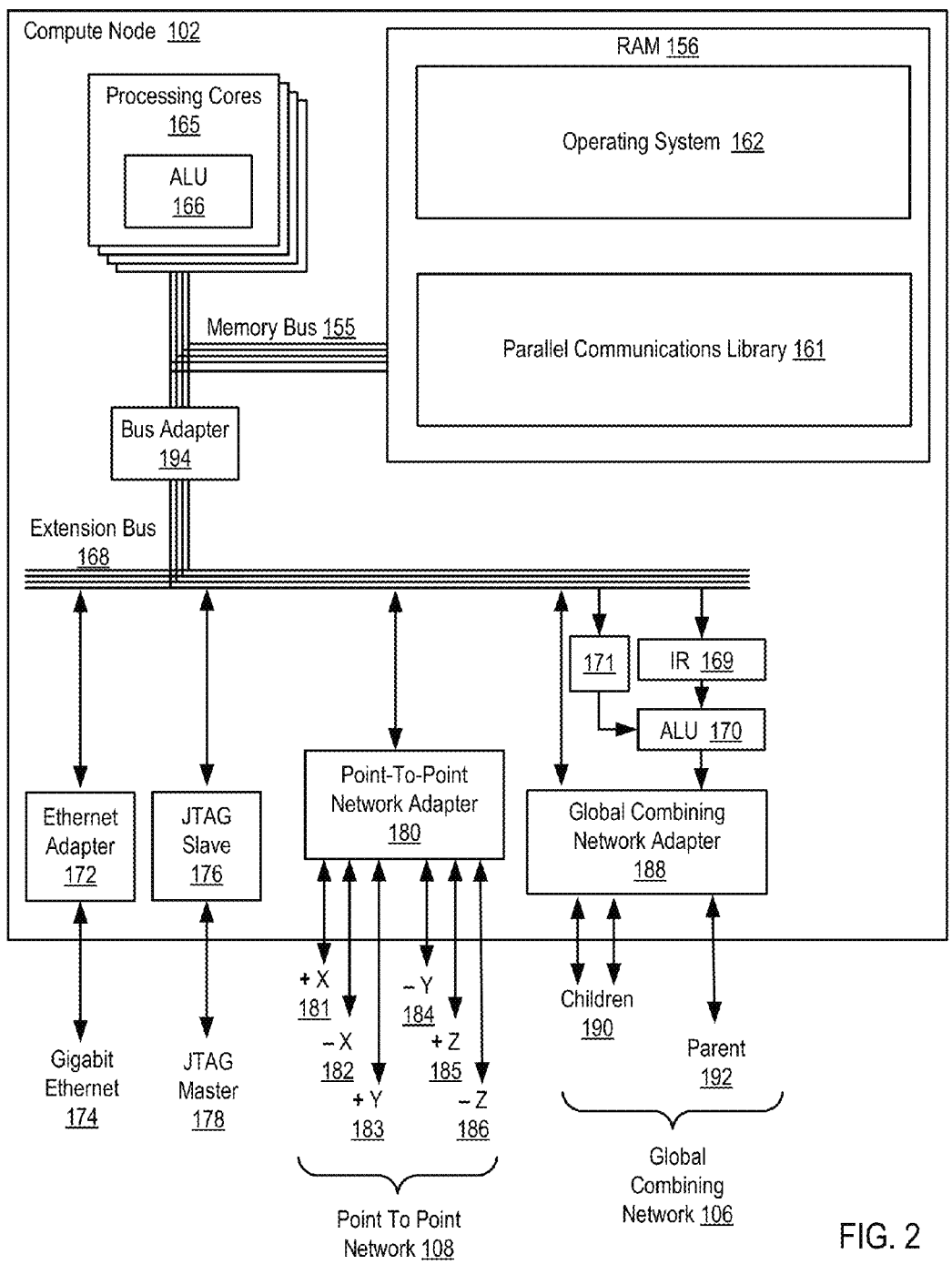
FIG. 2 sets forth a block diagram of an example compute node useful in adjusting environmental variables in an adaptive parameter adjustment runtime environment according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for adjusting environmental variables in an adaptive parameter adjustment runtime environment according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for adjusting environmental variables in an adaptive parameter adjustment runtime environment according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
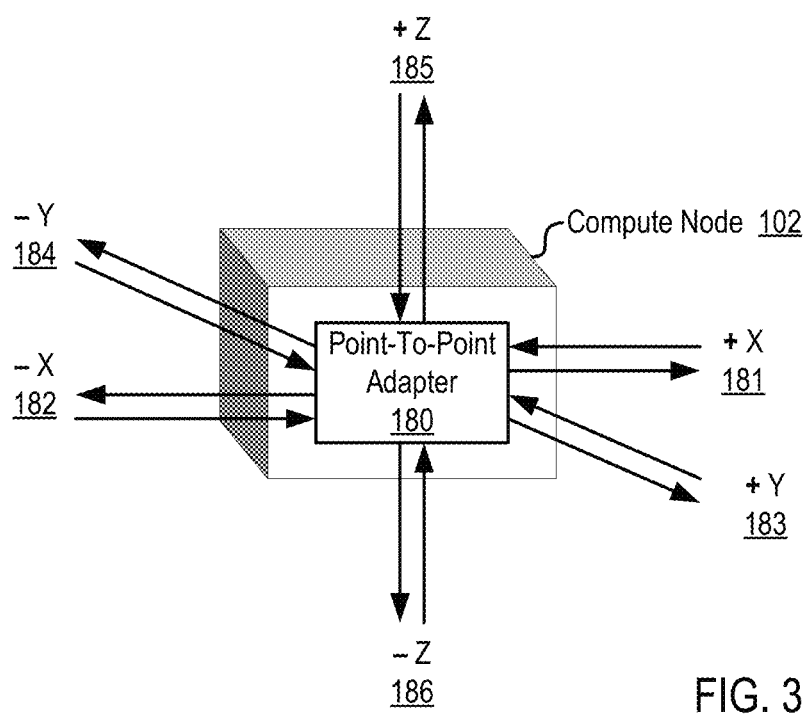
FIG. 3 sets forth a block diagram of an example Point-To-Point Adapter useful in systems for adjusting environmental variables in an adaptive parameter adjustment runtime environment according to embodiments of the present invention.

For further explanation, FIG. 3 sets forth a block diagram of an example Point-To-Point Adapter (180) useful in systems for adjusting environmental variables in an adaptive parameter adjustment runtime environment according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
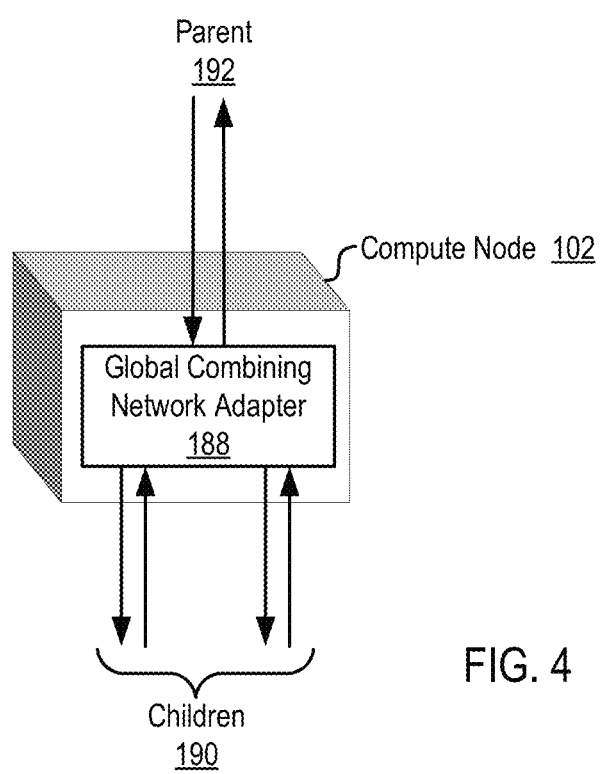
FIG. 4 sets forth a block diagram of an example Global Combining Network Adapter useful in systems for adjusting environmental variables in an adaptive parameter adjustment runtime environment according to embodiments of the present invention.

For further explanation, FIG. 4 sets forth a block diagram of an example Global Combining Network Adapter (188) useful in adjusting environmental variables in an adaptive parameter adjustment runtime environment according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
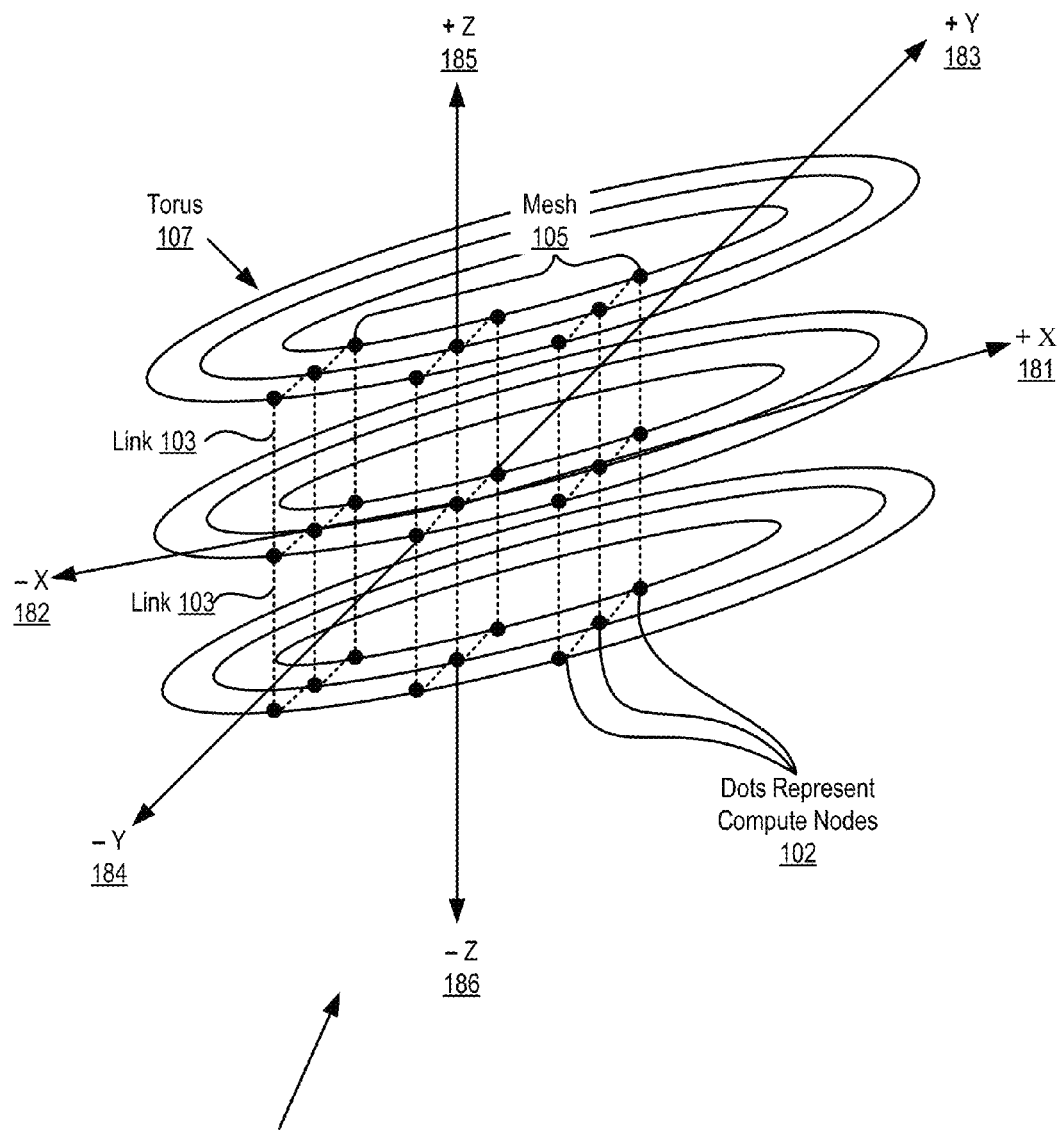
FIG. 5 sets forth a line drawing illustrating an example data communications network optimized for point-to-point operations useful in systems capable of adjusting environmental variables in an adaptive parameter adjustment runtime environment according to embodiments of the present invention.

For further explanation, FIG. 5 sets forth a line drawing illustrating an example data communications network (108) optimized for point-to-point operations useful in systems capable of adjusting environmental variables in an adaptive parameter adjustment runtime environment according to embodiments of the present invention. In the example of FIG. 5, dots represent compute nodes (102) of a parallel computer, and the dotted lines between the dots represent data communications links (103) between compute nodes. The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in adjusting environmental variables in an adaptive parameter adjustment runtime environment in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in adjusting environmental variables in an adaptive parameter adjustment runtime environment in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 6:
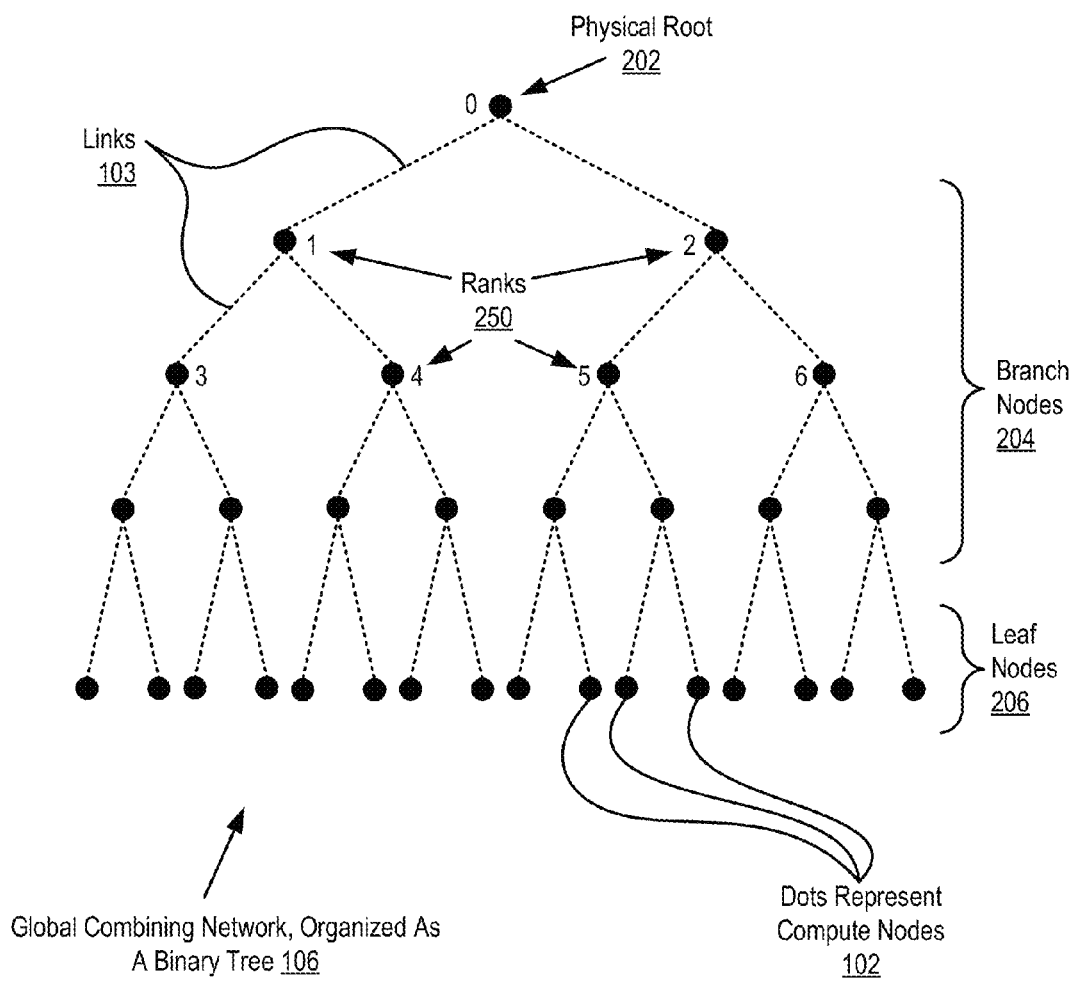
FIG. 6 sets forth a line drawing illustrating an example global combining network useful in systems capable of adjusting environmental variables in an adaptive parameter adjustment runtime environment according to embodiments of the present invention.

For further explanation, FIG. 6 sets forth a line drawing illustrating an example global combining network (106) useful in systems capable of adjusting environmental variables in an adaptive parameter adjustment runtime environment according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in adjusting environmental variables in an adaptive parameter adjustment runtime environment in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
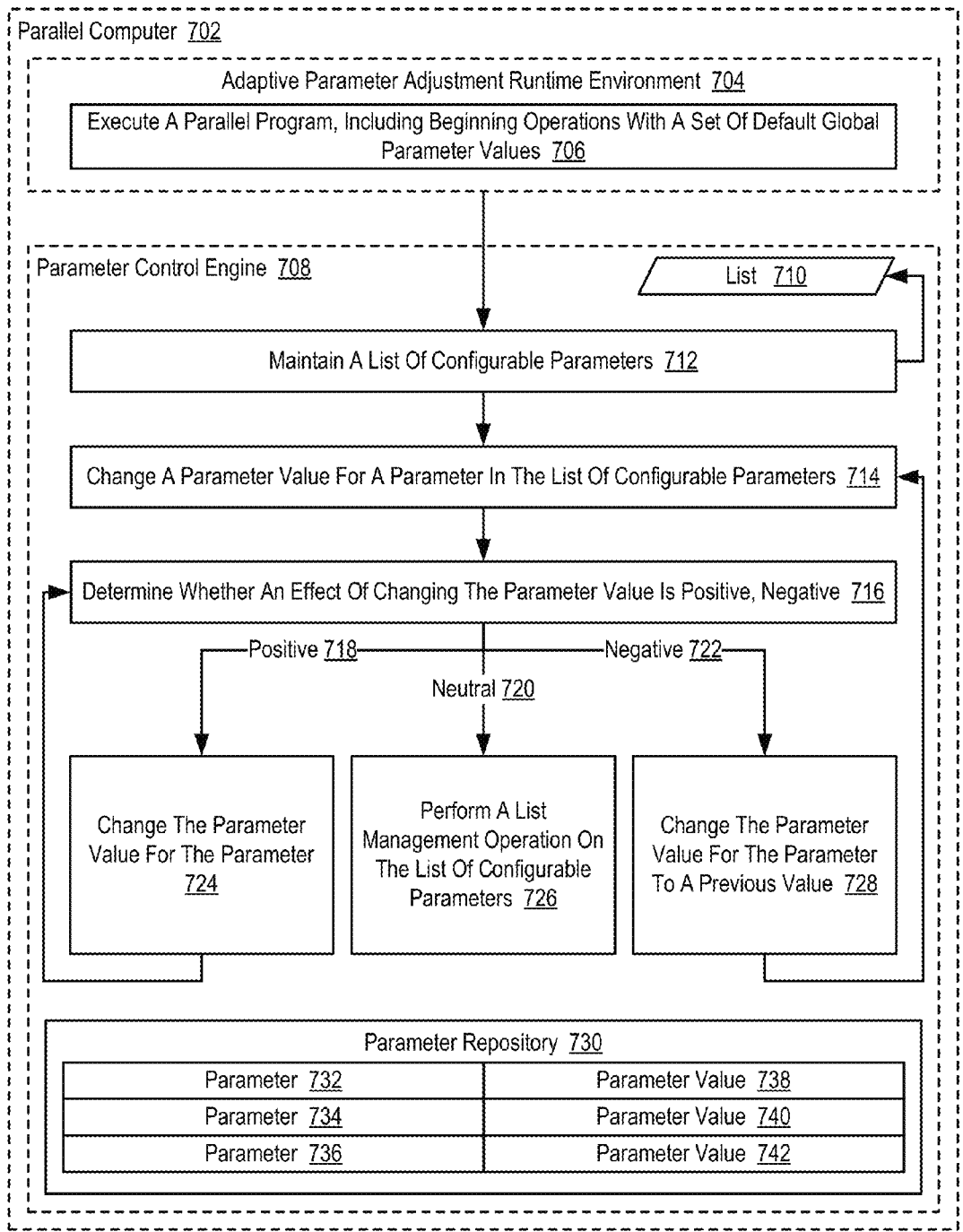
FIG. 7 sets forth a flow chart illustrating an example method for adjusting environmental variables in an adaptive parameter adjustment runtime environment according to embodiments of the present invention.

For further explanation, FIG. 7 sets forth a flow chart illustrating an example method for adjusting environmental variables in an adaptive parameter adjustment runtime environment (704) according to embodiments of the present invention. In the example method of FIG. 7, the adaptive parameter adjustment runtime environment (704) represents a computing environment, including computing hardware, computing software, data communications networks, and other components for executing a parallel program in a parallel computer (702).

The adaptive parameter adjustment runtime environment (704) of FIG. 7 is defined, at least to some extent, by a plurality of configuration parameters that are used to configure the adaptive parameter adjustment runtime environment (704). Such configuration parameters can include, for example, configuration parameters for identifying which operational group in the parallel computer (702) will be executing the parallel program, configuration parameters for identifying which data communications networks will be utilized by compute nodes in the parallel computer (702) that will be executing the parallel program, configuration parameters for identifying which data communications protocol will be used by the compute nodes in the parallel computer (702) that will be executing the parallel program, configuration parameters for determining the size of messages that will be exchanged by compute nodes in the parallel computer (702) that will be executing the parallel program, and so on. In the example depicted in FIG. 7, such configuration parameters may include parameters (732, 734, 736) in a parameter repository (730) such as a database. In such an example, each parameter (732, 734, 736) in the parameter repository (730) may be associated with a parameter value (738, 740, 742) used to help define the adaptive parameter adjustment runtime environment (704).

The example method depicted in FIG. 7 is carried out, at least in part, by a parameter control engine (708). The parameter control engine (708) of FIG. 7 represents a module of computer program instructions executing on computer hardware such as a computer processor. The parameter control engine (708) of FIG. 7 may be configured for adjusting environmental variables in an adaptive parameter adjustment runtime environment (704) by interacting with a user or system administrator to receive desired changes to one or more configurable parameters, interacting with the adaptive parameter adjustment runtime environment (704) to determine the performance impact associated with changing one or more configurable parameters, and so on.

The example method depicted in FIG. 7 includes executing (706) a parallel program by the adaptive parameter adjustment runtime environment (704). In the example method of FIG. 7, the parallel program represents a computer program whose execution may be distributed across a plurality of processing units, such as a plurality of compute nodes in the parallel computer (702). Portions of the parallel program may be executed concurrently across the plurality of processing units, with the result of each concurrently executed portion of the parallel program subsequently being combined together as if the entire parallel program had been executed by a single processing unit. In the example method depicted in FIG. 7, executing (706) a parallel program by the adaptive parameter adjustment runtime environment (704) can include beginning execution of the parallel program with a set of default global parameter values. The default global parameter values may be set by a system administrator during startup of the parallel computer (702) and stored in the parameter repository (730). In the example method of FIG. 7, the default global parameter values may be utilized to configure the adaptive parameter adjustment runtime environment (704) prior to beginning execution of the parallel program.

The example method depicted in FIG. 7 also includes maintaining (712), by a parameter control engine (708), a list (710) of configurable parameters. The list (710) of configurable parameters depicted in FIG. 7 can include those parameters (732, 734, 736) in the parameter repository (730) whose parameter values (738, 740, 742) may be changed by a system administrator, tuning algorithm, or other user. In such an example, the adaptive parameter adjustment runtime environment (704) may be reconfigured by changing one or more of the parameter values (738, 740, 742) in the parameter repository (730), thereby causing some aspect of the adaptive parameter adjustment runtime environment (704) to change. In the example method of FIG. 7, certain parameters (732, 734, 736) in the parameter repository (730) may be static while other parameters (732, 734, 736) in the parameter repository (730) may be configurable. As such, the list (710) of the parameters that are configurable may be maintained (712) for use in tuning the adaptive parameter adjustment runtime environment (704) by providing an identification of those parameters (732, 734, 736) in the parameter repository (730) that are configurable. The list (710) of configurable parameters may be received from a system administrator, set during initialization of the parallel computer (702), or otherwise constructed to distinguish configurable parameters from those parameters that are not configurable.

The example method depicted in FIG. 7 also includes changing (714), by the parameter control engine (708), a parameter value (738, 740, 742) for a parameter (732, 734, 736) in the list (710) of configurable parameters. In the example method of FIG. 7, changing (714) a parameter value (738, 740, 742) for a parameter (732, 734, 736) in the list (710) of configurable parameters may be carried out by a system administrator or other user designating a new parameter value (738, 740, 742) for a parameter (732, 734, 736) in the list (710) of configurable parameters. In alternative embodiments, changing (714) a parameter value (738, 740, 742) for a parameter (732, 734, 736) in the list (710) of configurable parameters may be initiated by a tuning algorithm configured to test all available values for each parameter (732, 734, 736) in the list (710) of configurable parameters. Changing (714) a parameter value (738, 740, 742) for a parameter (732, 734, 736) in the list (710) of configurable parameters may be carried out, for example, by writing a new parameter value for a particular parameter into the parameter repository (730) and configuring the adaptive parameter adjustment runtime environment (704) in accordance with the new parameter value.

The example method depicted in FIG. 7 also includes determining (716), by the parameter control engine (708), whether an effect of changing the parameter value (738, 740, 742) is positive, negative, or neutral. In the example method of FIG. 7, determining (716) whether an effect of changing the parameter value (738, 740, 742) is positive, negative, or neutral may be carried out by determining the performance impact of changing the parameter value (738, 740, 742). In such an example, the performance impact of changing the parameter value (738, 740, 742) may be determined with respect to one or more particular performance metrics. For example, determining the performance impact of changing the parameter value (738, 740, 742) may include determining whether changing the parameter value (738, 740, 742) causes the average delivery time for exchanging packets between compute nodes participating in the execution of the parallel program to increase, decrease, or remain the same. Alternatively, determining the performance impact of changing the parameter value (738, 740, 742) may include determining whether changing the parameter value (738, 740, 742) cause the amount of network bandwidth utilized by the compute nodes participating in the execution of the parallel program to increase, decrease, or remain the same.

The example method depicted in FIG. 7 also includes changing (724), by the parameter control engine (708), the parameter value (738, 740, 742) for the parameter (732, 734, 736). In the example method of FIG. 7, changing (724) the parameter value (738, 740, 742) for the parameter (732, 734, 736) is carried out in response to determining that the effect of changing the parameter value (738, 740, 742) is positive (718). Consider an example in which a parameter associated with the size of messages to be exchanged between compute nodes in the parallel computer (702) is decreased from a first value to a second value. Assume that in such an example, changing the size of messages to be exchanged between compute nodes in the parallel computer (702) causes the percentage of packets that are unsuccessfully delivered between compute nodes in the parallel computer (702) to decrease. In such an example, the effect of changing the parameter value (738, 740, 742) is positive (718), at least with respect to the delivery rate for exchanging packets between compute nodes in the parallel computer (702). In response to determining that the effect of changing the parameter value (738, 740, 742) is positive (718), the parameter control engine (708) may change (724) the parameter value (738, 740, 742) for the parameter (732, 734, 736) by further decreasing the size of messages to be exchanged between compute nodes in the parallel computer (702). In such an example, the parameter control engine (708) may again determine (716) whether an effect of the additional change is positive, negative, or neutral. In such a way, the parameter control engine (708) may continue to change (724) the parameter value (738, 740, 742) for the parameter (732, 734, 736)—so long as the impact of such changes are positive—thereby incrementally tuning the (724) the parameter value (738, 740, 742) for the parameter (732, 734, 736) towards an optimal value.

The example method depicted in FIG. 7 also includes changing (728), by the parameter control engine (708), the parameter value (738, 740, 742) for the parameter (732, 734, 736) to a previous value. In the example method of FIG. 7, changing (728) the parameter value (738, 740, 742) for the parameter (732, 734, 736) is carried out in response to determining that the effect of changing the parameter value (738, 740, 742) is negative (722). In the example method of FIG. 7, changing the parameter value (738, 740, 742) has a positive, neutral, or negative effect relative to a previous parameter value (738, 740, 742). As such, when the effect of changing the parameter value (738, 740, 742) is negative (722), the parameter value (738, 740, 742) for the parameter (732, 734, 736) may be changed (728) back to a previous value.

The example method depicted in FIG. 7 also includes performing (726), by the parameter control engine (708), a list management operation on the list (710) of configurable parameters. Performing (726) a list management operation on the list (710) of configurable parameters may include, for example, removing a particular parameter from the list (710) of configurable parameters such that the value associated with the parameter can no longer be changed. In the example method of FIG. 7, performing (726) a list management operation on the list (710) of configurable parameters may be carried out in response to determining that the effect of changing the parameter value (738, 740, 742) is neutral (720). The effect of changing the parameter value (738, 740, 742) may be neutral (720), for example, when the parameter has no impact on the performance parallel program. In the example method of FIG. 7, determining that the effect of changing the parameter value (738, 740, 742) is neutral (720) may indicate that adjusting a particular parameter has no performance impact on the execution of the parallel program. As such, the particular parameter may be removed (726) from the list (710) of configurable parameters in order to focus future tuning efforts on those parameters that do impact the performance of executing the parallel program.

Figure 8:
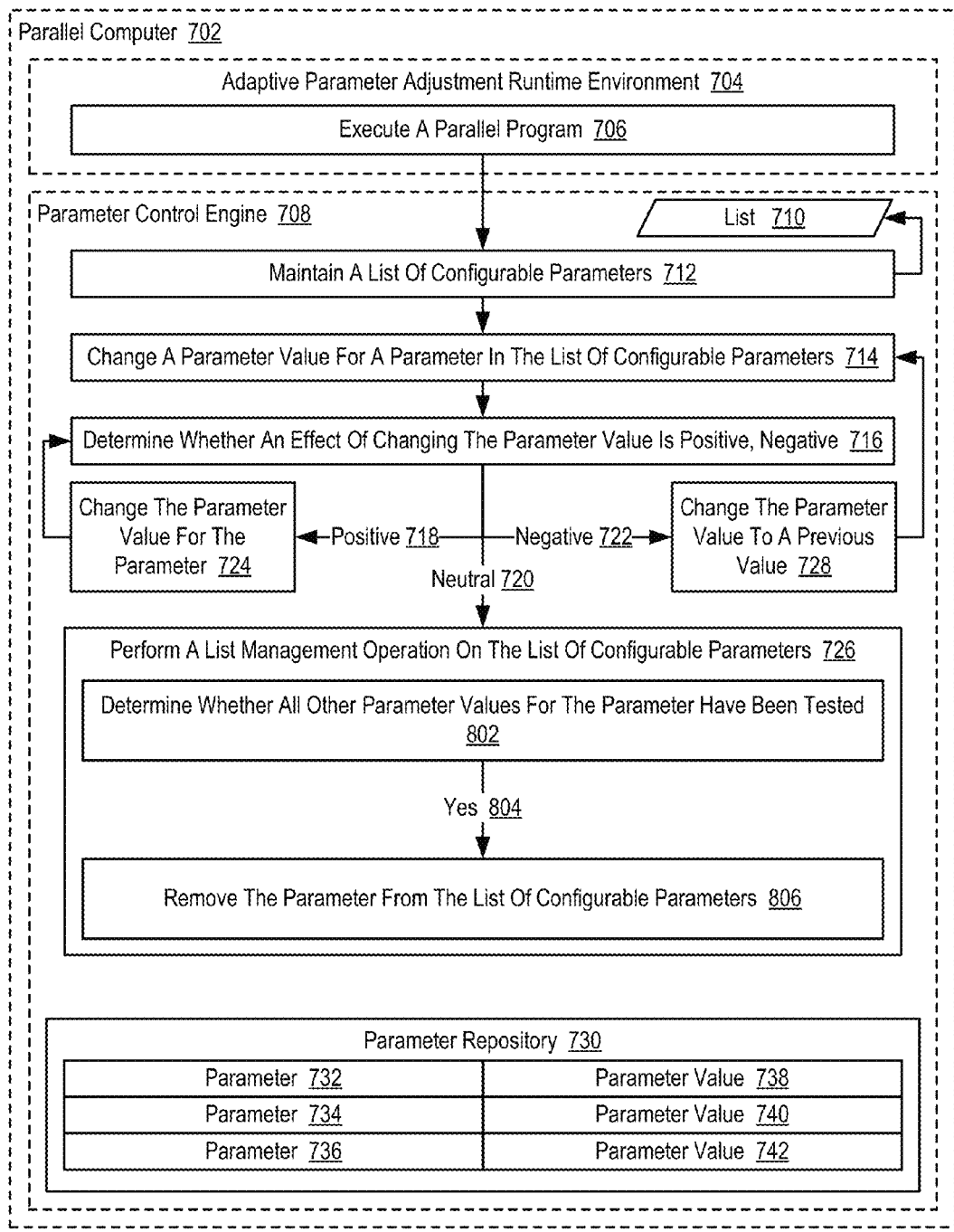
FIG. 8 sets forth a flow chart illustrating an example method for adjusting environmental variables in an adaptive parameter adjustment runtime environment according to embodiments of the present invention.

For further explanation, FIG. 8 sets forth a flow chart illustrating an additional example method for adjusting environmental variables in an adaptive parameter adjustment runtime environment (704) according to embodiments of the present invention. The example method depicted in FIG. 8 is similar to the example method depicted in FIG. 7, as it also includes executing (706) a parallel program by the adaptive parameter adjustment runtime environment (704), maintaining (712) a list (710) of configurable parameters, changing (714) a parameter value (738, 740, 742) for a parameter (732, 734, 736) in the list (710) of configurable parameters, determining (716) whether an effect of changing the parameter value (738, 740, 742) is positive, negative, or neutral, changing (724) the parameter value (738, 740, 742) for the parameter (732, 734, 736) in response to determining that the effect of changing the parameter value (738, 740, 742) is positive (718), changing (728) the parameter value (738, 740, 742) for the parameter (732, 734, 736) in response to determining that the effect of changing the parameter value (738, 740, 742) is negative (722), and performing (726) a list management operation on the list (710) of configurable parameters in response to determining that the effect of changing the parameter value (738, 740, 742) is neutral (720).

In the example method depicted in FIG. 8, performing (726) a list management operation on the list (710) of configurable parameters also includes determining (802) whether all other parameter values for the parameter (732, 734, 736) have been tested. In the example method of FIG. 8, the set of available parameter values for the parameter (732, 734, 736) may include a finite number of values. Consider an example in which the parameter (732, 734, 736) is used to determine which data communications protocol will be utilized for exchanging messages between compute nodes participating in the execution of the parallel program. In such an example, the parameter (732, 734, 736) may only be set to a finite number of values given that only a finite number of data communications protocols exist and are supported by the parallel computer (702). In such an example, the parameter control engine (708) may maintain information identifying the available values for a particular parameter (732, 734, 736) and may also maintain information identifying which the available values for a particular parameter (732, 734, 736) have been utilized and evaluated relative to other available values.

In the example method depicted in FIG. 8, performing (726) a list management operation on the list (710) of configurable parameters also includes removing (804), by the parameter control engine (708), the parameter from the list (710) of configurable parameters. Removing (804) the parameter from the list (710) of configurable parameters has the effect of preventing subsequent changes to the parameter value of the parameter. In the example method of FIG. 8, the only parameters whose values are changed (714) are the parameter (732, 734, 736) in the list (710) of configurable parameters. As such, by removing (804) a particular parameter from the list (710) of configurable parameters, the value for such a particular parameter is no longer changed (714).

In the example of FIG. 8, removing (804) the parameter from the list (710) of configurable parameters is carried out in response to affirmatively (804) determining that all other parameter values for the parameter have been tested. In the example method depicted in FIG. 8, because all possible parameter values for the parameter (732, 734, 736) have been tested, the current parameter value (738, 740, 742) for the parameter (732, 734, 736) will be set to an optimal value in view of the fact that a changing the value of the parameter (732, 734, 736) in a way that produces a negative (722) performance impact will result in changing (728) the parameter value (738, 740, 742) back to a previous value.

In the example method depicted in FIG. 8, the adaptive parameter adjustment runtime environment (704) can include an operational group of compute nodes that form the adaptive parameter adjustment runtime environment (704). As described above with reference to FIG. 1, each operational group (132 of FIG. 1) of compute nodes is the set of compute nodes upon which a collective parallel operation executes. Each compute node in the operational group (132 of FIG. 1) is assigned a unique rank that identifies the particular compute node in the operational group (132 of FIG. 1), and collective operations may be implemented with data communications among the compute nodes of an operational group. Such an operational group (132 of FIG. 1) may be implemented as, for example, an MPI 'communicator.'

In such an example, the parameter (732, 734, 736) in the list (710) of configurable parameters may be a parameter for a data communications operation between the compute nodes in the operational group (132 of FIG. 1). In the example method of FIG. 8, parameters for a data communications operation between the compute nodes in the operational group (132 of FIG. 1) may define how compute nodes in the operational group (132 of FIG. 1) communicate with each other. Such parameters may include, for example, an identification of a clock that is used to coordinate the timing of messages, a parameter identifying whether messages can be transmitted out of order, a parameter identifying whether messages will be sent by passing message packets to a receiver or writing message packets directly into memory of a receiver, an address of a buffer that packets for a particular compute node should be written to, and so on.

In the example depicted in FIG. 8, the parameter (732, 734, 736) in the list (710) of configurable parameters may also be embodied as a parameter of a collective operation of an MPI communicator executing a parallel program. As described above with reference to FIG. 1, an MPI communicator can carry out collective operations. Collective operations are those functions that involve all the compute nodes of an operational group (132 of FIG. 1). A collective operation is an operation, a message-passing computer program instruction that is executed simultaneously, that is, at approximately the same time, by all the compute nodes in an operational group (132 of FIG. 1) of compute nodes. Collective operations are often built around point-to-point operations. A collective operation requires that all processes on all compute nodes within an operational group (132 of FIG. 1) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132 of FIG. 1). In such an example, the parameter (732, 734, 736) in the list (710) of configurable parameters may be a parameter that is utilized to impact how a particular collective operation is carried out. For example, the parameter (732, 734, 736) in the list (710) of configurable parameters may include message size for messages exchanged as part of a collective operation, a buffer size for buffers on each compute node that participates in the collective operation, a parameter used to determine whether the processing of messages received as part of the collective operation are offloaded to a special purpose controller rather than a CPU in the compute node, and so on.

In the example depicted in FIG. 8, the parameter (732, 734, 736) in the list (710) of configurable parameters may also be embodied as a parameter that defines a geometry of compute nodes in a parallel computer (702). In the example method of FIG. 8, the geometry of compute nodes in the parallel computer (702) can define the way that the compute nodes in the parallel computer (702) are logically organized. For example, three compute nodes (node A, node B, and node C) may configured for data communications with each other may be logically organized into a binary tree such that one compute node (node A) is designated as a root compute node while the other two compute nodes (node B, node C) are designated as leaf compute nodes. In such an example, parameters that define a geometry of compute nodes in a parallel computer (702) would include parameters associated with the root compute node (node A) that identifies the other compute nodes (node B, node C) as children of the root compute node (node A). Parameters that define a geometry of compute nodes in the parallel computer (702) would include parameters associated with the leaf compute nodes (node B, node C) that designate the root compute node (node A) as a parent compute node. In such an example, changing these parameters would result in reconfigure the geometry of compute nodes in the parallel computer (702).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™ programming language. Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of adjusting environmental variables in an adaptive parameter adjustment runtime environment, the method comprising:
   executing a parallel program by the adaptive parameter adjustment runtime environment, including beginning operations with a set of default global parameter values;
   maintaining, by a parameter control engine, a list of configurable parameters;
   changing, by the parameter control engine, a parameter value for a parameter in the list of configurable parameters;
   determining, by the parameter control engine, whether an effect of changing the parameter value is positive, negative, or neutral;
   responsive to determining that the effect of changing the parameter value is positive, changing, by the parameter control engine, the parameter value for the parameter;
   responsive to determining that the effect of changing the parameter value is negative, changing, by the parameter control engine, the parameter value for the parameter to a previous value; and
   responsive to determining that the effect of changing the parameter value is neutral, performing, by the parameter control engine, a list management operation on the list of configurable parameters.

2. The method of claim 1 wherein performing the list management operation on the list of configurable parameters further comprises:
   determining whether all other parameter values for the parameter have been tested; and
   responsive to determining that all other parameter values for the parameter have been tested, removing, by the parameter control engine, the parameter from the list of configurable parameters.

3. The method of claim 1 further comprising:
   further responsive to determining that the effect of changing the parameter value is negative, determining whether all other parameter values for the parameter have been tested; and
   responsive to determining that all other parameter values for the parameter in a negative effect or a neutral effect, removing, by the parameter control engine, the parameter from the list of configurable parameters.

4. The method of claim 1 wherein:
   the adaptive parameter adjustment runtime environment includes an operational group of compute nodes that form the adaptive parameter adjustment runtime environment; and
   the parameter in the list of configurable parameters is a parameter for a data communications operation between the compute nodes in the operational group.

5. The method of claim 1 wherein the parameter in the list of configurable parameters is a parameter of a collective operation of an MPI communicator executing a parallel program.

6. The method of claim 1 wherein the parameter in the list of configurable parameters is a parameter that defines a geometry of compute nodes in a parallel computer.

* * * * *